United States Patent
Pyo et al.

(10) Patent No.: US 10,748,456 B2
(45) Date of Patent: Aug. 18, 2020

(54) DISPLAY DEVICE

(71) Applicant: LG ELECTRONICS INC., Seoul (KR)

(72) Inventors: Jonggil Pyo, Seoul (KR); Hanseok Hwangbo, Seoul (KR); Byunghee Kim, Seoul (KR); Jaeyong Kim, Seoul (KR); Kyungmin Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/169,875

(22) Filed: Oct. 24, 2018

(65) Prior Publication Data

US 2020/0035133 A1   Jan. 30, 2020

(30) Foreign Application Priority Data

Jul. 30, 2018 (KR) .................. 10-2018-0088889
Sep. 21, 2018 (WO) ............... PCT/KR2018/011209

(51) Int. Cl.
| | |
|---|---|
| *G09F 9/30* | (2006.01) |
| *G09F 9/302* | (2006.01) |
| *H01L 27/32* | (2006.01) |
| *H01L 51/52* | (2006.01) |
| *F16M 11/20* | (2006.01) |

(52) U.S. Cl.
CPC .......... *G09F 9/301* (2013.01); *F16M 11/2014* (2013.01); *G09F 9/3023* (2013.01); *H01L 27/3225* (2013.01); *H01L 51/5237* (2013.01)

(58) Field of Classification Search
CPC ... G09F 9/301; G09F 9/3023; H01L 51/5237; H01L 27/3225; F16M 11/2014
See application file for complete search history.

(56) References Cited

U.S. PATENT DOCUMENTS 4,951,730 A * 8/1990 Hsu .......................... E06B 9/70
                                                                 160/23.1
5,121,977 A * 6/1992 Weisgerber ............ G03B 21/56
                                                                   352/43

(Continued)

FOREIGN PATENT DOCUMENTS

| JP | 2008503000 | 1/2008 |
| KR | 1020070018556 | 2/2007 |

(Continued)

OTHER PUBLICATIONS

PCT International Application No. PCT/KR2018/011209, International Search Report dated Apr. 26, 2019, 4 pages.

*Primary Examiner* — Jinhee J Lee
*Assistant Examiner* — Theron S Milliser
(74) *Attorney, Agent, or Firm* — Lee, Hong, Degerman, Kang & Waimey PC

(57) ABSTRACT

A display device includes a housing in which an opening is formed, a roller rotatably disposed in the housing, a display module rolled around the roller or unrolled from the roller, a lift module connected to the display module and lifting the display module through the opening, a door disposed in the housing and opening and closing the opening, and a door driving module disposed in the housing and connected to the door to move the door to a closed position, a partially open position, or a maximum open position.

18 Claims, 13 Drawing Sheets

(56) References Cited

U.S. PATENT DOCUMENTS

| | | | | |
|---|---|---|---|---|
| 5,341,241 A | * | 8/1994 | Shopp | E06B 9/17007 |
| | | | | 359/443 |
| 5,468,040 A | * | 11/1995 | Peng Hsieh | B60J 1/2019 |
| | | | | 160/310 |
| 5,482,100 A | * | 1/1996 | Kuhar | E06B 9/32 |
| | | | | 160/170 |
| 5,615,729 A | * | 4/1997 | Matsumoto | B60J 1/2019 |
| | | | | 160/370.22 |
| 5,653,278 A | * | 8/1997 | Cheng | B60J 1/2019 |
| | | | | 160/24 |
| 5,752,560 A | * | 5/1998 | Cherng | B60J 1/2019 |
| | | | | 160/22 |
| 5,791,721 A | * | 8/1998 | Lin | B60J 1/2019 |
| | | | | 160/265 |
| 6,191,886 B1 | * | 2/2001 | Sinkoff | G03B 21/58 |
| | | | | 160/24 |
| 6,283,192 B1 | * | 9/2001 | Toti | E06B 9/30 |
| | | | | 160/170 |
| 6,484,993 B2 | * | 11/2002 | Huffman | F16M 11/046 |
| | | | | 248/323 |
| 6,491,332 B2 | * | 12/2002 | De Ceuster | B60R 5/047 |
| | | | | 160/24 |
| 6,633,286 B1 | * | 10/2003 | Do | B64D 11/0015 |
| | | | | 345/204 |
| 6,675,862 B2 | * | 1/2004 | Kobayashi | B60J 1/2019 |
| | | | | 160/370.22 |
| 6,834,705 B2 | * | 12/2004 | Seel | B60J 1/2019 |
| | | | | 160/370.22 |
| 7,042,528 B2 | * | 5/2006 | Lester | B60R 11/0235 |
| | | | | 348/825 |
| 7,517,029 B2 | | 4/2009 | Cvek | |
| 7,619,814 B2 | * | 11/2009 | Liang | G03B 21/58 |
| | | | | 359/443 |
| 7,621,489 B2 | | 11/2009 | Cvek | |
| 7,623,290 B2 | * | 11/2009 | Liang | G03B 21/56 |
| | | | | 359/443 |
| 7,665,709 B2 | | 2/2010 | Cvek | |
| 8,079,651 B2 | | 12/2011 | Cvek | |
| 8,107,166 B2 | * | 1/2012 | Tsai Chen | G03B 21/58 |
| | | | | 348/836 |
| 8,276,857 B2 | | 10/2012 | Cvek | |
| 8,376,581 B2 | | 2/2013 | Auld et al. | |
| 8,529,106 B2 | | 9/2013 | Jung et al. | |
| 9,743,542 B2 | | 8/2017 | Heo et al. | |
| 10,135,018 B2 | * | 11/2018 | Seo | H05K 7/20954 |
| 2004/0206462 A1 | * | 10/2004 | Fitzgerald | E06B 9/115 |
| | | | | 160/231.1 |
| 2005/0248170 A1 | * | 11/2005 | Kawamoto | B60N 2/793 |
| | | | | 296/24.34 |
| 2006/0000955 A1 | | 1/2006 | Cvek | |
| 2006/0000956 A1 | | 1/2006 | Cvek | |
| 2006/0102812 A1 | | 5/2006 | Cvek | |
| 2007/0035671 A1 | | 2/2007 | Ryu et al. | |
| 2010/0084535 A1 | | 4/2010 | Cvek | |
| 2010/0084536 A1 | | 4/2010 | Cvek | |
| 2012/0002357 A1 | | 1/2012 | Auld et al. | |
| 2012/0147463 A1 | | 6/2012 | Jung et al. | |
| 2012/0200915 A1 | * | 8/2012 | Kuroi | G03B 21/58 |
| | | | | 359/443 |
| 2013/0018510 A1 | | 1/2013 | Cvek et al. | |
| 2014/0002430 A1 | * | 1/2014 | Kwack | G09G 3/3225 |
| | | | | 345/207 |
| 2016/0202729 A1 | * | 7/2016 | Lee | G06F 1/1652 |
| | | | | 361/750 |
| 2016/0231843 A1 | * | 8/2016 | Kim | G06F 3/0412 |
| 2017/0013726 A1 | * | 1/2017 | Han | H05K 1/028 |
| 2017/0023978 A1 | * | 1/2017 | Cho | H04M 1/0268 |
| 2017/0156219 A1 | * | 6/2017 | Heo | G02F 1/133305 |
| 2017/0156220 A1 | * | 6/2017 | Heo | H05K 1/028 |
| 2017/0156225 A1 | | 6/2017 | Heo et al. | |
| 2017/0180578 A1 | * | 6/2017 | Nimura | H04N 1/00777 |
| 2017/0196102 A1 | * | 7/2017 | Shin | H05K 1/189 |

FOREIGN PATENT DOCUMENTS

| | | |
|---|---|---|
| KR | 1020110084219 | 7/2011 |
| KR | 1020120100881 | 9/2012 |
| KR | 1020170062342 | 6/2017 |

* cited by examiner

DISPLAY DEVICE

CROSS-REFERENCE TO RELATED APPLICATIONS

Pursuant to 35 U.S.C. § 119, this application claims the benefit of earlier filing date and right of priority to Korean Patent Application No. 10-2018-0088889, filed on Jul. 30, 2018, and also claims priority to International Application No. PCT/KR2018/011209, filed on Sep. 21, 2018, the contents of which are all hereby incorporated by reference in their entirety.

TECHNICAL FIELD

The present invention relates to a display device.

BACKGROUND

As the information society develops, the demand for display devices is increasing in various forms. In recent years, various display devices such as liquid crystal display device (LCD), plasma display panel (PDP), electro luminescent display (ELD), and vacuum fluorescent display (VFD) have been studied and used.

A display device using an organic light emitting diode (OLED) is superior to a liquid crystal display device in terms of luminance characteristics and viewing angle characteristics, and does not require a backlight unit, thereby realizing an ultra-thin display device.

The flexible display may be bent or rolled around the roller. A flexible display may be used to implement a display device that is unfoldable or rollable around a roller as needed. At this time, there is a problem that the flexible display is stably rolled around or unrolled from the roller.

SUMMARY

Embodiments provide a display device capable of minimizing penetration of foreign substances and having high stability.

A display device according to an embodiment of the present invention includes: a housing in which an opening is formed; a roller rotatably disposed in the housing; a display module rolled around the roller or unrolled from the roller; a lift module connected to the display module and lifting the display module through the opening; a door disposed on the housing and opening and closing the opening; and a door driving module disposed in the housing and connected to the door to selectively move the door to a closed position, a partially open position, and a maximum open position.

The display device may further include a control unit configured to control the door driving module, the display module, and the lift module.

When power is turned on, the control unit may control the door driving module in a maximum open mode, turns on the display module, and then control the door driving module in a partial open mode.

When the display module is turned on, the lift module may lift the display module to a partial lifting height or a maximum lifting height. The door driving module may advance the door to the partially open position after the lifting of the display module to the partial lifting height or the maximum lifting height is completed.

When power is turned off, the control unit may control the door driving module in a maximum open mode, turns off the display module, and then control the door driving module in a close mode.

When the display module is turned off, the lift module may lower the display module to a maximum lowering height. The door driving module may advance the door to the closed position after the lowering of the display module to the maximum lowering height is completed.

The door driving module may include: a guide bracket mounted in the housing; and a carrier disposed to advance and retreat along the guide bracket and connected to the door. The guide bracket may be provided with a sensor module configured to sense the position of the carrier.

The sensor module may further include a plurality of sensors disposed in a row in an advance and retreat direction of the carrier. The carrier may be provided with a sensing target selectively sensed by the plurality of sensors.

The plurality of sensors may include a photo sensor in which a light emitting element and a light receiving element face each other. The sensing target may pass between the light emitting element and the light receiving element.

The plurality of sensors may include: a first sensor configured to sense the closed position of the door; a second sensor configured to sense the partially open position of the door; and a third sensor configured to sense the maximum open position of the door.

The second sensor may be disposed between the first sensor and the third sensor. The second sensor may be disposed to be closer to the third sensor rather than the first sensor.

The sensor module may further include a sensor mounter installed in the guide bracket. The plurality of sensors may be mounted on the sensor mounter.

The door driving module may include: a guide bracket mounted on the housing; and a carrier disposed to advance and retreat along the guide bracket and connected to the door. A plurality of guide members having different heights may be provided in the carrier. The guide bracket may include: a first guide rail guiding a first guide member having a highest height among the plurality of guide members; and a second guide rail guiding a second guide member having a lower height than the first guide member among the plurality of guide members.

A plurality of third guide members having different heights from the first guide member and the second guide member may be provided in the carrier. The plurality of third guide members may have the same height. The guide bracket may be provided with a third guide rail guiding the plurality of third guide members.

The third guide rail may have a lower height than the first guide rail and the second guide rail.

The door driving module may include: a guide bracket mounted on the housing; a carrier disposed to advance and retreat along the guide bracket and connected to the door; and an advance and retreat mechanism mounted on the guide bracket and advancing and retreating the carrier.

The carrier may be provided with a rack which is elongated in an advance and retreat direction of the carrier. The advance and retreat mechanism may include: a pinion engaged with the rack; a motor; and at least one power transmission member transmitting a driving force of the motor to the pinion between the motor and the pinion.

The at least one power transmission member may include: a worm gear connected to a rotational shaft of the motor; a worm wheel engaged with the worm gear; and a torque limiter connected to the worm wheel and including a gear engaged with the pinion.

The display device may further include: a sub-guide bracket mounted on the housing and spaced apart from the guide bracket; a sub-carrier connected to the door, provided with a sub-rack, and disposed to advance and retreat along the sub-guide bracket; a sub-pinion engaged with the sub-rack; and an connecting shaft connecting the pinion and the sub-pinion.

The display device may further include a guide plate connecting the guide bracket and the sub-guide bracket.

The details of one or more embodiments are set forth in the accompanying drawings and the description below. Other features will be apparent from the description and drawings, and from the claims.

DETAILED DESCRIPTION OF THE EMBODIMENTS

Hereinafter, specific embodiments of the present invention will be described in detail with reference to the accompanying drawings.

Hereinafter, specific embodiments of the present invention will be described in detail with reference to the accompanying drawings.

Figure 1:
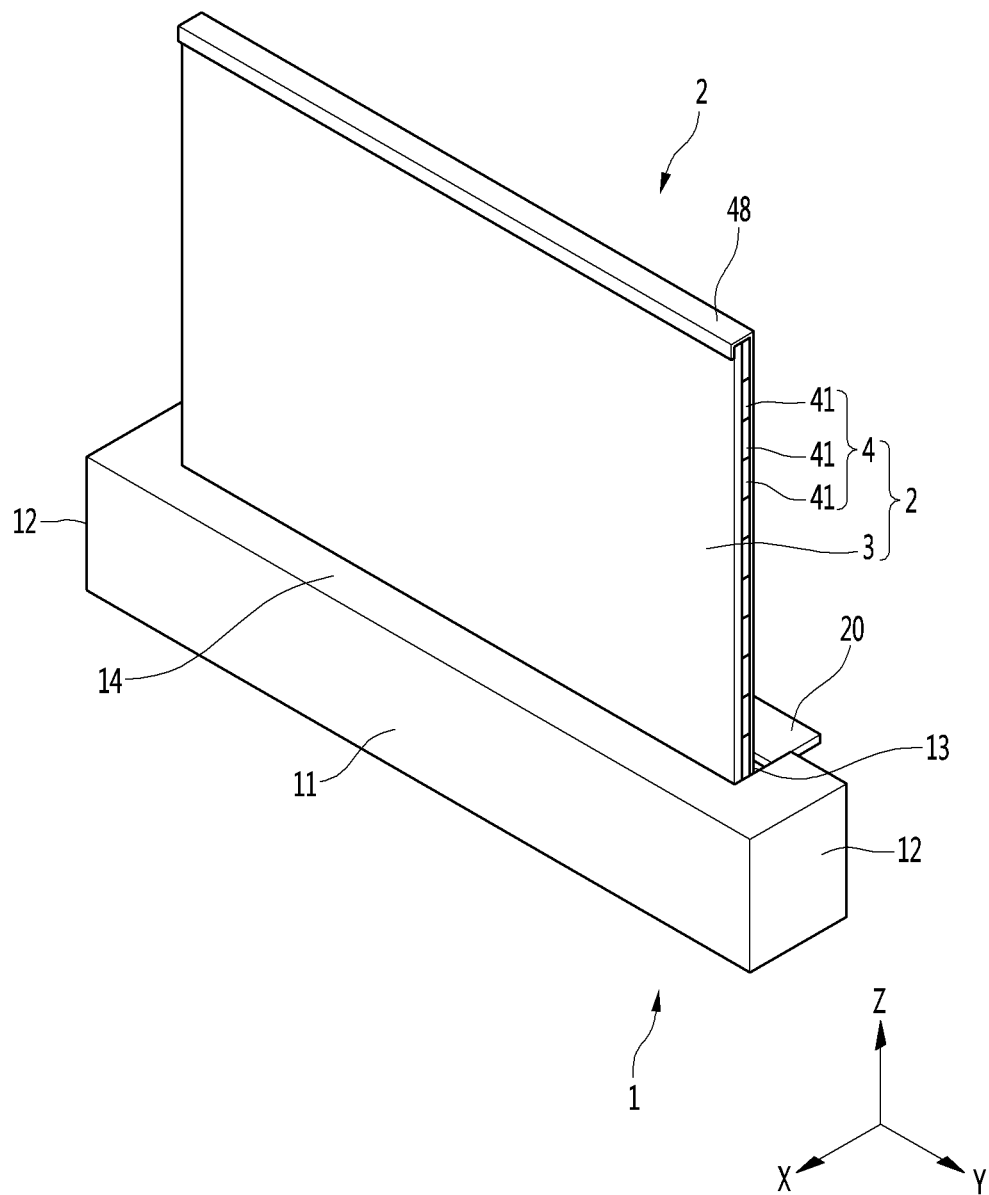
FIG. 1 is a perspective view of a display device according to an embodiment of the present invention.
Figure 2:
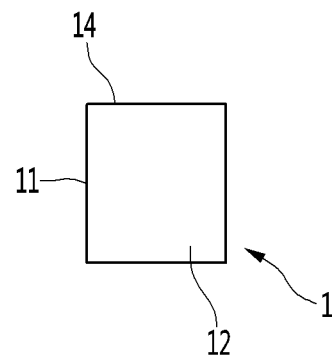
FIG. 2 is a side view illustrating a case where a display module is hidden in a housing, according to an embodiment of the present invention.
Figure 3:
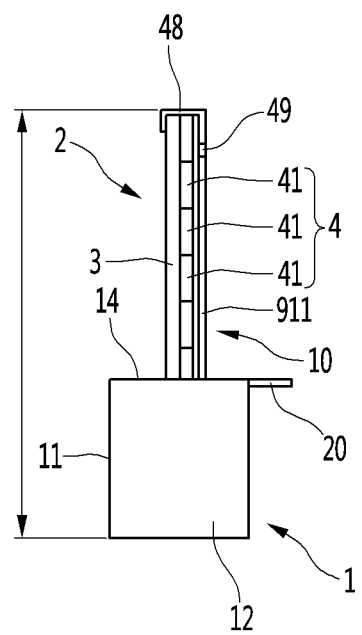
FIG. 3 is a side view illustrating a case where a part of the display module is lifted in the housing illustrated in FIG. 2.
Figure 4:
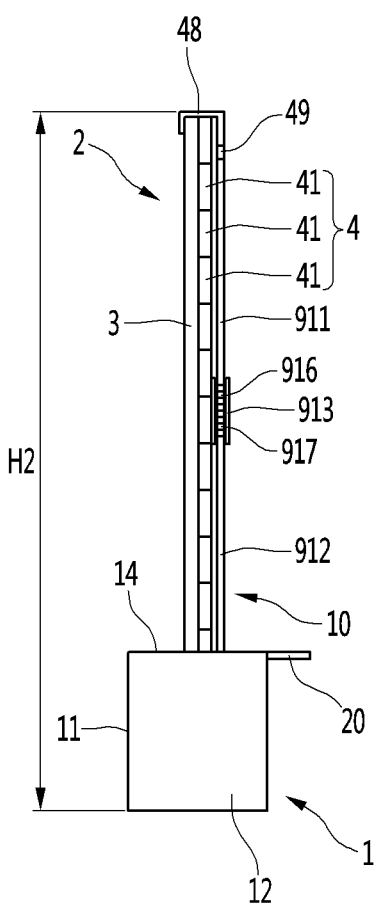
FIG. 4 is a side view illustrating a case where the display module is lifted to a maximum lifting height, according to an embodiment of the present invention.
Figure 5:
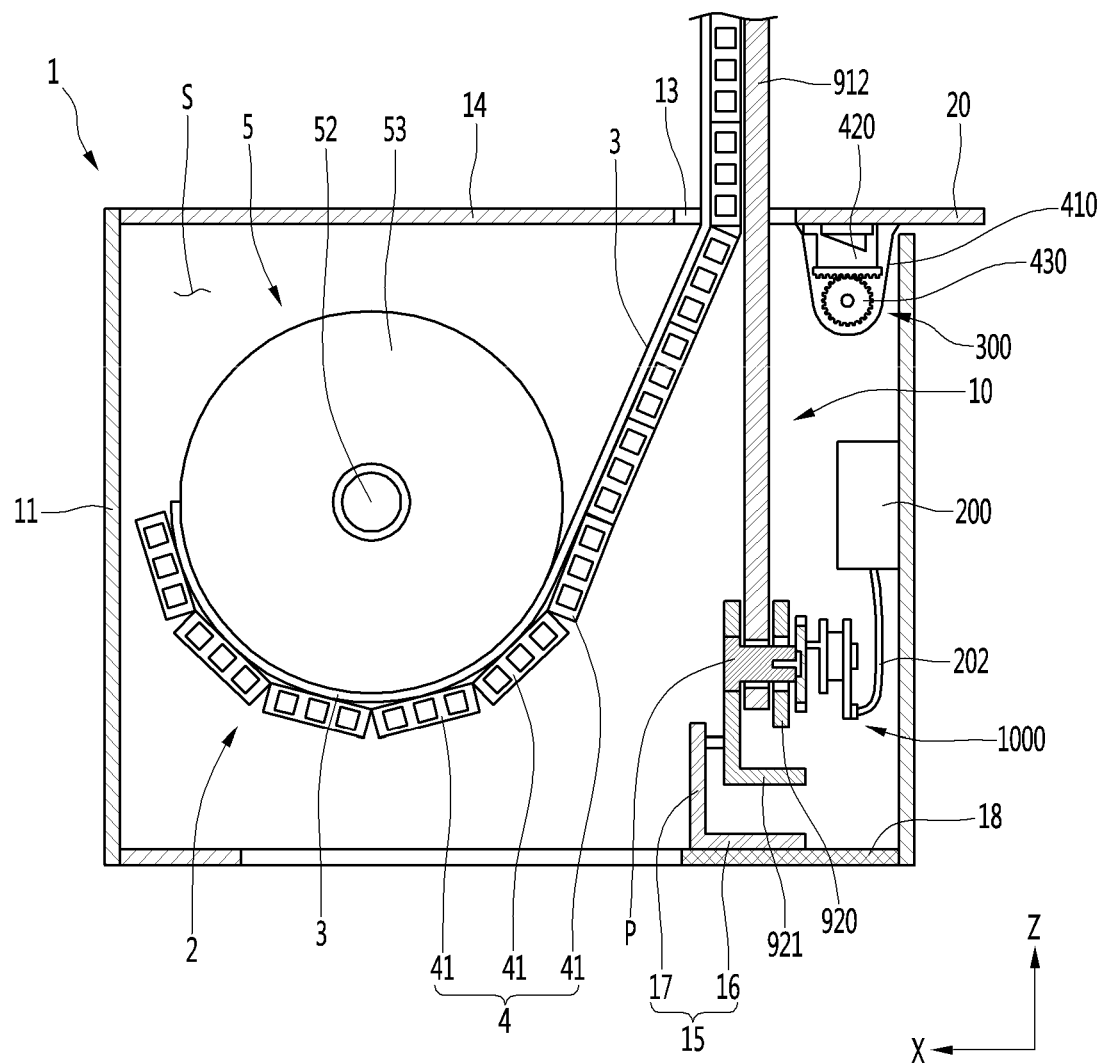
FIG. 5 is a cross-sectional view illustrating the inside of the display device according to the embodiment of the present invention.

FIG. 1 is a perspective view of a display device according to an embodiment of the present invention, FIG. 2 is a side view illustrating a case where a display module is hidden in a housing, according to an embodiment of the present invention, FIG. 3 is a side view illustrating a case where a part of the display module is lifted in the housing illustrated in FIG. 2, FIG. 4 is a side view illustrating a case where the display module is lifted to a maximum lifting height, according to an embodiment of the present invention, and FIG. 5 is a cross-sectional view illustrating the inside of the display device according to the embodiment of the present invention.

Figure 6:
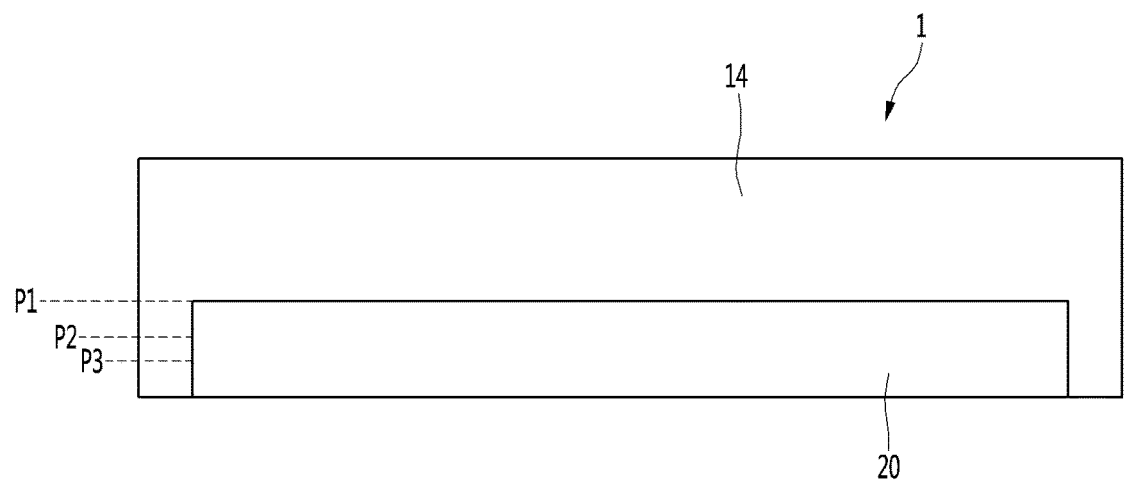
FIG. 6 is a plan view illustrating a case where a door is in a closed position, according to an embodiment of the present invention.
Figure 7:
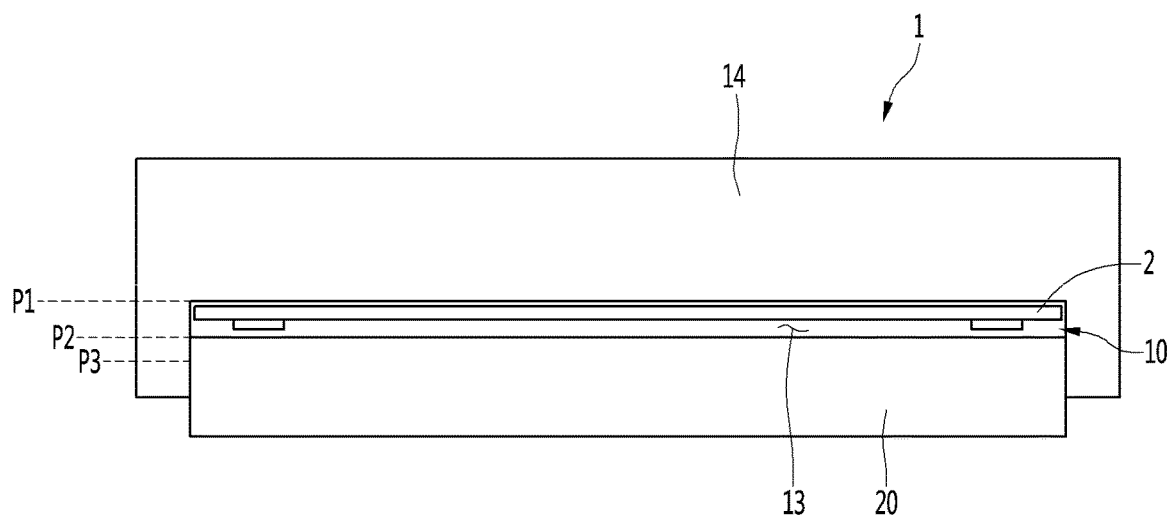
FIG. 7 is a plan view illustrating a case where the door is in a partially open position according to an embodiment of the present invention.
Figure 8:
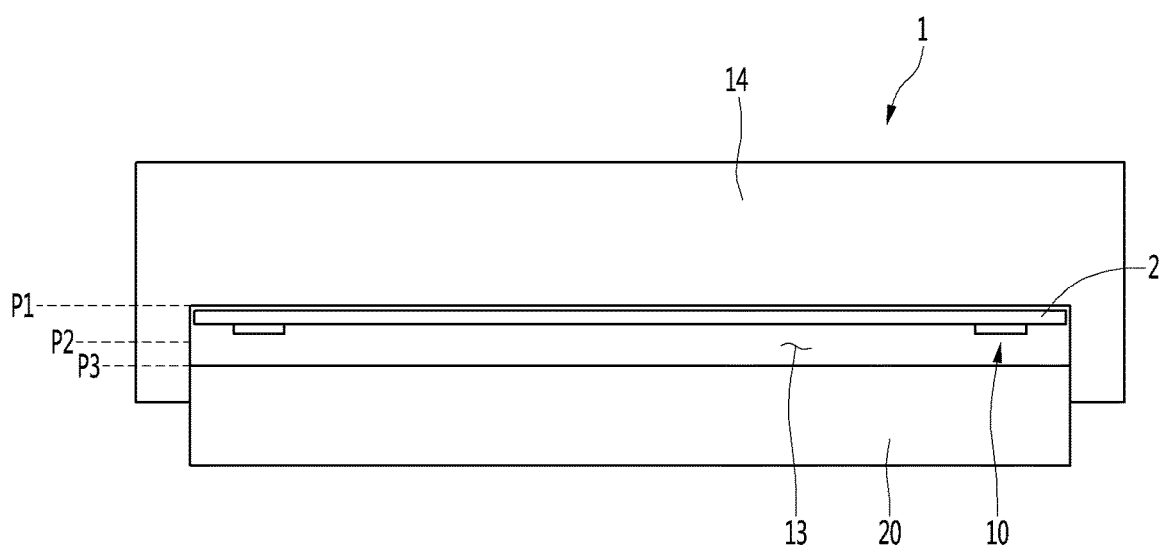
FIG. 8 is a plan view illustrating a case where the door is in a maximum open position, according to an embodiment of the present invention.

FIG. 6 is a plan view illustrating a case where a door is in a closed position, according to an embodiment of the present invention, FIG. 7 is a plan view illustrating a case where the door is in a partially open position according to an embodiment of the present invention, and FIG. 8 is a plan view illustrating a case where the door is in a maximum open position, according to an embodiment of the present invention.

A display device includes a housing 1, and a display module 2 which is lowered to the housing 1 or lifted above the housing 1. The display module 2 may include a display panel 3 and a display cover 4.

The display device may further include a roller 5. When the display module 2 is lowered, the display module 2 is rolled around the roller 5. The roller 5 may be disposed in the housing 1. The display module 2 is configure to be rolled around the roller 5.

The display device may include a lift module 10 which lifts or lowers the display module 2. The lift module 10 may be connected to the display module 2, and the display module 2 may be lifted or lowered by the lift module 10 in a state of being connected to the lift module 10.

The display device may have a thickness in a front-back direction (X), have a width in a horizontal direction (Y), and have a height in a vertical direction (Z).

The housing 1 may include a combination of a plurality of members. A space S in which the roller 5 is accommodated may be formed in the housing 1. When the display module 2 is lowered, the display module 2 may be accommodated in the space S together with the rollers 5. When the display module 2 is lifted, at least a part of the display module 2 may be lifted above the space S. Only a part or all of the display module 2 may be lifted above the space S according to the lifted height.

The roller 5 may be rotatably accommodated in the interior of the housing 1. The housing 1 may be provided with a roller supporter 51 (see FIGS. 4 to 6) which rotatably supports the roller 5. A pair of roller supporters 51 may be provided in the housing 1, and the roller 5 may be rotatably supported to the pair of roller supporters 51 between the pair of roller supporters 51. The roller 5 may include a rotational shaft 52 rotatably supported to the roller supporter 51. The roller 5 may include a roller body 53 around which the display module 2 is rolled. The roller body 53 is connected to the rotational shaft 52 and may be rotated around the rotational shaft 52.

The display module 2 may be connected to the roller body 53. When the roller body 53 is rotated about the rotational shaft 52, the display module 2 may be rolled around or unrolled from the roller body 53 in a state of being connected to the roller body 53.

The housing 1 may include a front cover 11 covering the rollers 5 in front of the rollers 5. The front cover 11 may form the front surface appearance of the housing 1.

The housing 1 may further include at least one side cover 12 which covers the roller 5 on the side of the roller 5. The side cover 12 may form the side surface appearance of the housing 1. A pair of side covers 12 may be provided, and the pair of side covers 12 may include a left cover positioned on the left side of the roller 5 and a right side cover positioned on the right side of the roller 5.

The housing 1 may be provided with an opening 13 through which the display module 2 passes. The housing 1 may further include a top cover 14 which forms an upper surface appearance. The opening 13 may be formed in the top cover 14 so as to be vertically opened.

The display device may include a door 20 is configured to cover the opening 13. The door 20 opens and closes the opening 13. The door 20 may be disposed on the housing 1. The door 20 may be disposed in the top cover 14 so as to extend or retreat horizontally to open or close the opening 13, or may be arranged to be rotated in the vertical direction. The door 20 may be positioned in the opening 13 to close the opening 13 when all of the display module 2 is inserted into the space S of the housing 1, and the door 20 may open the opening 13 before at least a part of the display module 2 is lifted to the upper side of the housing 1.

The display module 2 may be rolled around the roller 5 and all of the display module 2 may be accommodated in the space S. At least a part of the display module 2 may be unrolled from the roller 5 and lifted above the space S.

The thickness of the display module 2 may be thinner than the thickness of the housing 1. The width of the housing 1 may be longer than the width of the display module 2. When the display module 2 is unfolded, the height (that is, the top height of the display module) may be higher than the height of the housing 1 (that is, the top height of the housing). When the display module 2 is maximally lowered, the display module 2 may be inserted into the space S of the housing 1 and concealed in the housing 1, and when at least a part of the display module 2 is lifted above the housing 1, the display module 2 may be exposed above the housing 1.

As illustrated in FIG. 2, the display module 2 may be inserted and accommodated into the housing 1. As illustrated in FIG. 2B, only a part of the display module 2 may be lifted to a predetermined height H1 on the upper surface of the housing 1. As illustrated in FIG. 2C, the display module 2 may be lifted to the maximum lifting height H2.

The display panel 3 preferably has elasticity such as an OLED or the like that may be bent or rolled. In this case, the display panel 3 may be a flexible display panel.

The display panel 3 may display an image through its front surface. A region of the display panel 3 which is exposed to the upper side of the housing 1 may be an active region in which an image may be seen from the outside. The region of the display panel 3 positioned in the space S of the housing 1 may be an inactive area in which no image may be seen from the outside.

The display cover 4 may be disposed on the back surface of the display panel 3 and may cover the back surface of the display panel 3.

The display cover 4 may be rolled around the roller 5 together with the display panel 3. The display cover 4 may be configured to support the display panel 3. The display cover 4 may have a higher strength than the display panel 3.

The front surface of the display cover 4 may be attached to the back surface of the display panel 3. The display cover 4 may be attached to the back surface of the display panel 3 by an adhesive means such as a double-sided tape or the like and may be integrated with the display panel 3.

The display cover 4 may include a plurality of segments 41. The segment 41 may also be referred to as an apron. Each of the plurality of segments 41 may be attached to the back surface of the display panel 3. The plurality of segments 41 may support the other segments positioned on the upper side while being in contact with the adjacent other segments in the vertical direction when the display module 2 is lifted. When the display module 2 is rolled around the roller 5, the display module 2 may be smoothly rolled around the roller 5 together with the display panel 3 while being spread with the adjacent other segments.

The display module 2 may further include a connecting bar 48. The connecting bar 48 may constitute the upper portion of the display module 2. The connecting bar 48 may be disposed to be elongated on the upper portion of the display cover 4. The connecting bar 48 may be fixed to at least one of the display panel 3 and the display cover 4 by a fastening member such as a screw or an adhesive means such as an adhesive. The connecting bar 48 may be connected to the lift module 10, and the display module 2 may be lifted and lowered by the connecting bar 48 when the lift module 10 lifts the connecting bar 48.

The display module 2 may not further include a separate connecting bar 48. In this case, the lift module 10 may be directly connected to at least one of the display panel 3 and the display cover 4.

The lift module 10 may be connected to the display module 2 to lift the display module 2 through the opening 13. The lift module 10 may be connected to the upper portion of the display module 2. The lift module 10 may lift or lower the display module 2. The lift module 10 may be disposed behind the display module 2 and may support the display module 2 at the rear of the display module 2. The lift module 10 may be covered by the display module 2 when viewed from the front of the display module 2.

The upper portion of the display module 2 may be connected to the lift module 10 and the lower portion of the display module 2 may be connected to the roller 5. The display module 2 may be rolled around the roller 5 between the upper portion connected to the lift module 10 and the lower portion connected to the roller 5.

The housing 1 may further include a lift module supporter 15 which supports the lift module 10. The lift module supporter 15 may be disposed apart from the top cover 14 and the lift module 10 may be mounted to the lift module supporter 15. A part of the lift module 10 may be lifted above the opening 13 or lowered below the opening 13 together with the display module 2 while the lift module 10 is mounted on the lift module supporter 15.

The lift module supporter 15 may be disposed to be accommodated in the space S of the housing 1. The lift module supporter 15 may include a lower plate 16 positioned below the lift module 10 and a front plate 17 erected from the lower plate 16, and may protect the lift module 10.

The housing 1 may further include a lower frame 18 on which the lift module supporter 15 is disposed. The lower frame 18 may be horizontally disposed to be elongated between the pair of side covers 12. The lower frame 18 may be connected to the pair of side covers 12. The lift module supporter 15 may be disposed on the lower frame 18 and may be supported by the lower frame 18.

The housing 1 may further include a back cover 19 which covers a portion of the lift module 10 accommodated in the space S of the housing 1. The back cover 19 may be disposed behind the door driving module 300 to be described below, and may function as a door driving module cover covering the door driving module 300 without being exposed to the outside.

The lift module 10 may include a pair of arms 911 and 912. The lift module 10 may further include an arm joint 913 connected to each of the pair of arms 911 and 912.

The pair of arms 911 and 912 may include a first arm 911 and a second arm 912. When one of the first arm 911 and the second arm 912 is rotated, the other may be connected to interlock and rotate.

Each of the first arm 911 and the second arm 912 may be rotatably connected to the arm joint 913. A driven gear 916 may be formed on the first arm 911, and a driving gear 917 may be formed on the second arm 912. The driving gear 917 is engaged with the driven gear 916 to rotate the driven gear 916.

Upon rotation of the second arm 912, the driving gear 917 may rotate the driven gear 916 in engagement with the driven gear 916. Upon rotation of the driven gear 915, the first arm 911 may be rotated about the driven gear 916.

The first arm 911 may be rotatably connected to the upper portion of the display module 2. The first arm 911 may be a driven arm which lifts and lowers the upper portion of the display module 2 while relatively rotating with the second arm 912. The driven arm may be connected directly to the display module 2 and may be connected to the display module 2 through a separate upper bracket 49.

When the second arm 912 rotates, the first arm 911 lifts and lowers the connecting bar 48 and the display module 2 may be lifted and lowered.

The first arm 911 may be rotatably connected to the connecting bar 48 and may be rotatably connected to the connecting bar 48 on the upper bracket 49. The upper bracket 49 may be fastened to the connecting bar 48 with a fastening member such as a screw. The upper portion of the first arm 911 may be connected to the connecting bar 48 or the upper bracket 49 by a hinge pin.

The lower portion of the first arm 911 may be rotatably connected to the upper portion of the arm joint 913. The lower portion of the first arm 911 may be connected to the upper portion of the arm joint 913 by a hinge pin.

The driven gear 916 may be formed below the first arm 911.

The second arm 912 may be a driving arm which rotates the first arm 911. The second arm 912 may be connected to the first arm 911 to rotate the first arm 911. The second arm 912 may be rotatably connected to the lower portion of the arm joint 913. The upper portion of the second arm 912 may be connected to the lower portion of the arm joint 913 by a hinge pin. The driving gear 917 engaged with the driven gear 916 may be formed on the upper portion of the second arm 912.

The second arm 912 may be rotatably supported on the housing 1. The second arm 912 may be rotatably connected to the lift module supporter 15 and may be rotatably connected to the separate arm supporters 920 and 921.

The arm supporters 920 and 921 may be mounted on the lift module supporter 15, and may rotatably support the second arm 912 in a state of being vertically erected on the lift module supporter 15.

The second arm 912 may be connected to an arm shaft P (see FIG. 3), which is a rotation center shaft of the second arm 912, and the second arm 912 may be rotated around the arm shaft P. The arm shaft P may be a horizontal shaft connected to the second arm 912, and may be arranged to be elongated in the front-back direction. The arm shaft P may be fastened to the second arm 912 so as to rotate integrally with the second arm 912 when the second arm 912 rotates.

The arm shaft P may be formed separately from the second arm 912 and then coupled to the second arm 912, or may integrally protrude from the second arm 912.

The arm shaft P may be rotatably supported by the arm supporters 920 and 921. A pair of arm supporters 920 and 921 may be provided, and the arm shaft P may be rotatably supported by the pair of arm supporters 920 and 921.

One of the pair of arm supporters 920 and 921 may be a first arm supporter mounted on the lift module supporter 15, the other of the pair of arm supporters 920 and 921 may be a second arm supporter mounted on the first arm supporter. A space in which a part of the second arm 912 is rotatably accommodated may be formed between the pair of arm supporters 920 and 921. The first arm supporter and the second arm supporter may be fastened by a fastening member such as a screw.

The pair of arm supporters 920 and 921 may be formed with through-holes through which the arm shaft P rotatably passes, and an arm shaft supporter such as a bearing for supporting the arm shaft P may be disposed in the through-hole.

When the second arm 912 is rotated about the arm shaft P, the second arm 912 may be rotated perpendicularly or substantially perpendicularly. The arm shaft P may rotatably connect the lower portion of the second arm 912 to the arm supporters 920 and 921.

The first arm 911 and the second arm 912 may be folded or unfolded while being connected to the arm joint 913. When the second arm 912 is rotated horizontally or substantially horizontally to the housing 1, the first arm 911 is horizontally or substantially horizontally laid down like the second arm 912 in a state of being connected to the arm joint 913. On the other hand, when the second arm 912 is rotated perpendicularly or substantially perpendicularly to the housing 1, the first arm 911 is erected perpendicularly or substantially perpendicularly like the second arm 912 above the second arm 912.

The lift module 10 may further include a rotation mechanism 100 (see FIGS. 9 to 11) which is connected to the second arm 912 to rotate the second arm 912. The rotation mechanism 100 may include a driving source such as a motor, and at least one power transmission member which transmits the driving force of the driving source to the second arm 912.

The display device may further include a control unit (200, see FIG. 5).

The control unit 200 may control the display module 2, the lift module 10, and the door driving module 300.

The control unit 200 may control the rotation mechanism 100 for operating the lift module 10.

The control unit 200 may be accommodated in the space S of the housing 1 and may be protected by the housing 1. The control unit 200 may include a main board having a circuit part for controlling the rotation mechanism 100. The control unit 200 may control the driving source of the rotation mechanism 100. When the control unit 200 drives the driving source of the rotation mechanism 100, the second arm 912 and the first arm 911 are rotated and the display module is lifted and lowered by the rotation of the first arm 911. The control unit 200 may control the driving source of the rotation mechanism 100 according to a sensing value of an angle sensor module 1000.

The display device may further include an angle sensor module 1000 connected to at least one of the arm shaft P and the second arm 912. The angle sensor module 1000 may be connected to the control unit 200 through a signal line 202. The sensing value sensed by the angle sensor module 1000 may be transmitted to the control unit 200 through the signal line 202.

The angle sensor module 1000 may be accommodated in the space S of the housing 1 and may be protected by the housing 1. The angle sensor module 1000 may be positioned between the arm supporters 920 and 921 and the housing 1. The angle sensor module 1000 may be positioned between the arm supporters 920 and 921 and the back cover 19. The size of the angle sensor module 1000 may be smaller than the size of each of the arm supporters 920 and 921 and the back cover 19, and may be protected by the arm supporters 920 and 921 and the back cover 19. The back cover 19 may cover the angle sensor module 1000 and may function as an angle sensor module cover.

The display device may further include the door driving module (300, see FIG. 5) connected to the door 20 and moving the door 20.

The door driving module 300 may be disposed in the housing 1.

The door driving module 300 may move the door 20 to a plurality of positions. As illustrated in FIGS. 6 to 8, the door driving module 300 may selectively move the door 20 to a closed position P1, a partially open position P2, and a maximum open position P3. That is, the opening 13 of the housing 1 may be opened and closed in a multi-stage manner by the door driving module 300 and the door 20.

The control unit 200 may control the display module 2 and the door driving module 300.

The control unit 200 may control the door driving module 300 in one of a plurality of modes. The plurality of modes may include a close mode in which the door 20 moves to the closed position P1, a partial open mode in which the door 20 moves to the partially open position P2, and a maximum open mode in which the door 20 moves to the maximum open position P3.

The control unit 200 may control the door driving module 300 in the close mode, the partial open mode, or the maximum open mode.

That is, the door driving module 300 may be controlled in the close mode in which the door 20 moves to the closed position P1 as illustrated in FIG. 6, may be controlled in the partial open mode in which the door moves to the partially open position P2 as illustrated in FIG. 7, and may be controlled in the maximum open mode in which the door 20 moves to the maximum open position P3 as illustrated in FIG. 8.

When the power of the display device is turned on, the control unit 200 may control the door driving module 300 in the maximum open mode and then turn on the display module 2. Then, the control unit 200 may control the door driving module 300 in the partial open mode.

When the display module 2 is turned on, the display module 2 may display image information. When the display module 2 is turned on, the lift module 10 may lift the display module 2 such that at least a part of the display module 2 is lifted above the opening 13. In this case, the lift module 10 may lift the display module 2 to the partial lifting height H1 or the maximum lifting height H2.

The display device may lift the display module 2 in a state in which the door 20 is in the maximum open position P3. When the lifting of the display module 2 to the partial lifting height H1 or the maximum lifting height H2 is completed, the door 20 may advance to the partially open position P2 that is a position close to the display module 2.

The maximum open position P3 may be a position at which the front end of the door 20 is spaced apart from the first arm 911 or the second arm 912 by a first distance. The partially open position P2 may be a position at which the front end of the door 20 is spaced apart from the first arm 911 or the second arm 912 by a second distance. The first distance may be longer than the second distance. The first distance may be twice to five times the second distance. For example, when the first distance is 13.5 mm, the second distance may be 3 mm.

Meanwhile, when the power of the display device is turned off, the control unit 200 may control the door driving module 300 in the maximum open mode and then turn off the display module 2. Then, the control unit 200 may control the door driving module 300 in the close mode.

When the display module 2 is turned off, the display module 2 may not display image information. When the display module 2 is turned off, the lift module 10 may lower the display module 2 to the maximum lowering height. The door driving module 300 may be controlled in the close mode when the lowering of the display module 2 to the maximum lowering height is completed.

That is, the display device may lower the display module 2 in a state in which the door 20 is in the maximum open position. When the lowering of the display module 2 is completed, the display device may advance the door 20 to the closed position.

Figure 9:
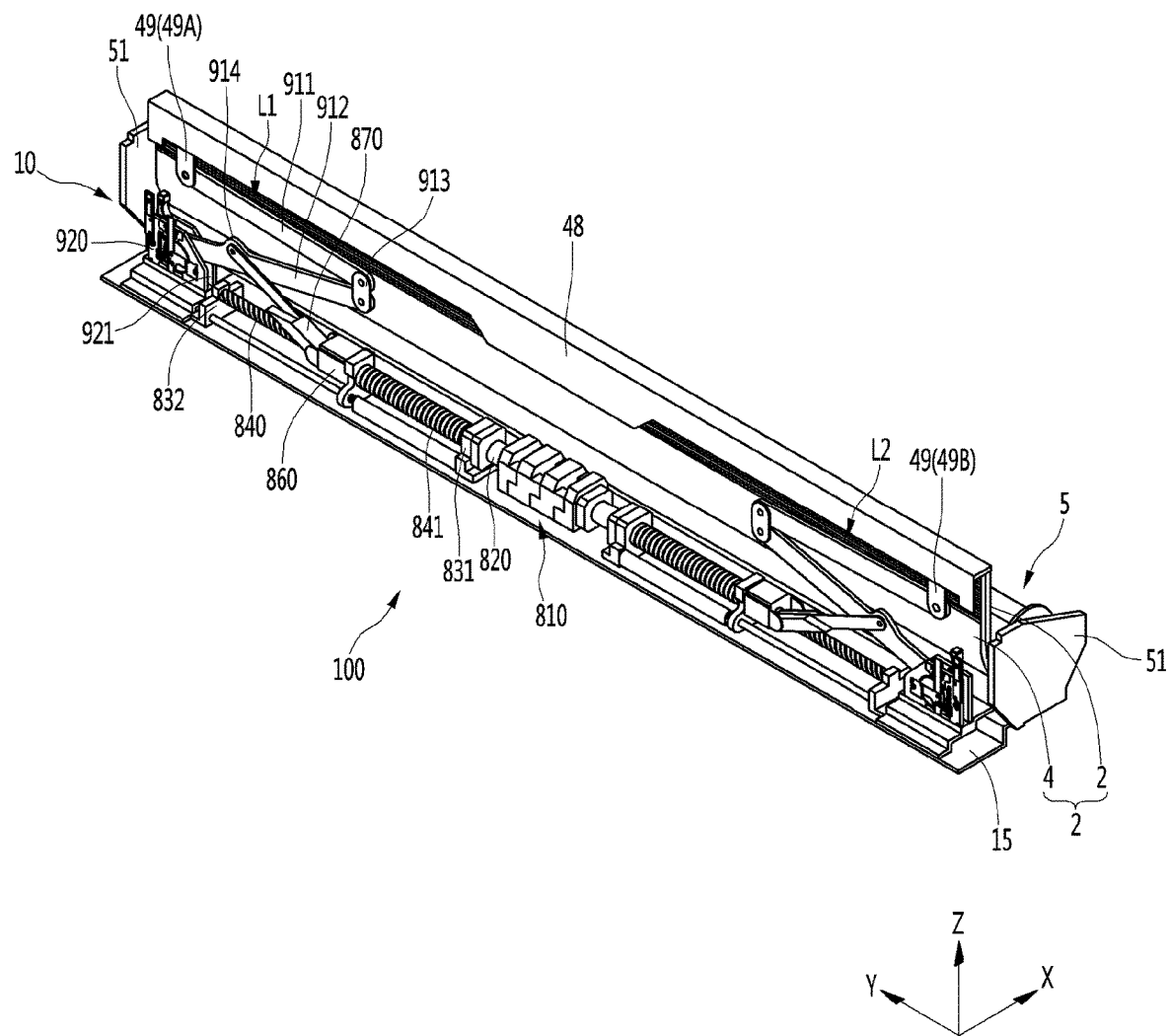
FIG. 9 is a perspective view illustrating a case where a lift module lowers the display module, according to an embodiment of the present invention.
Figure 10:
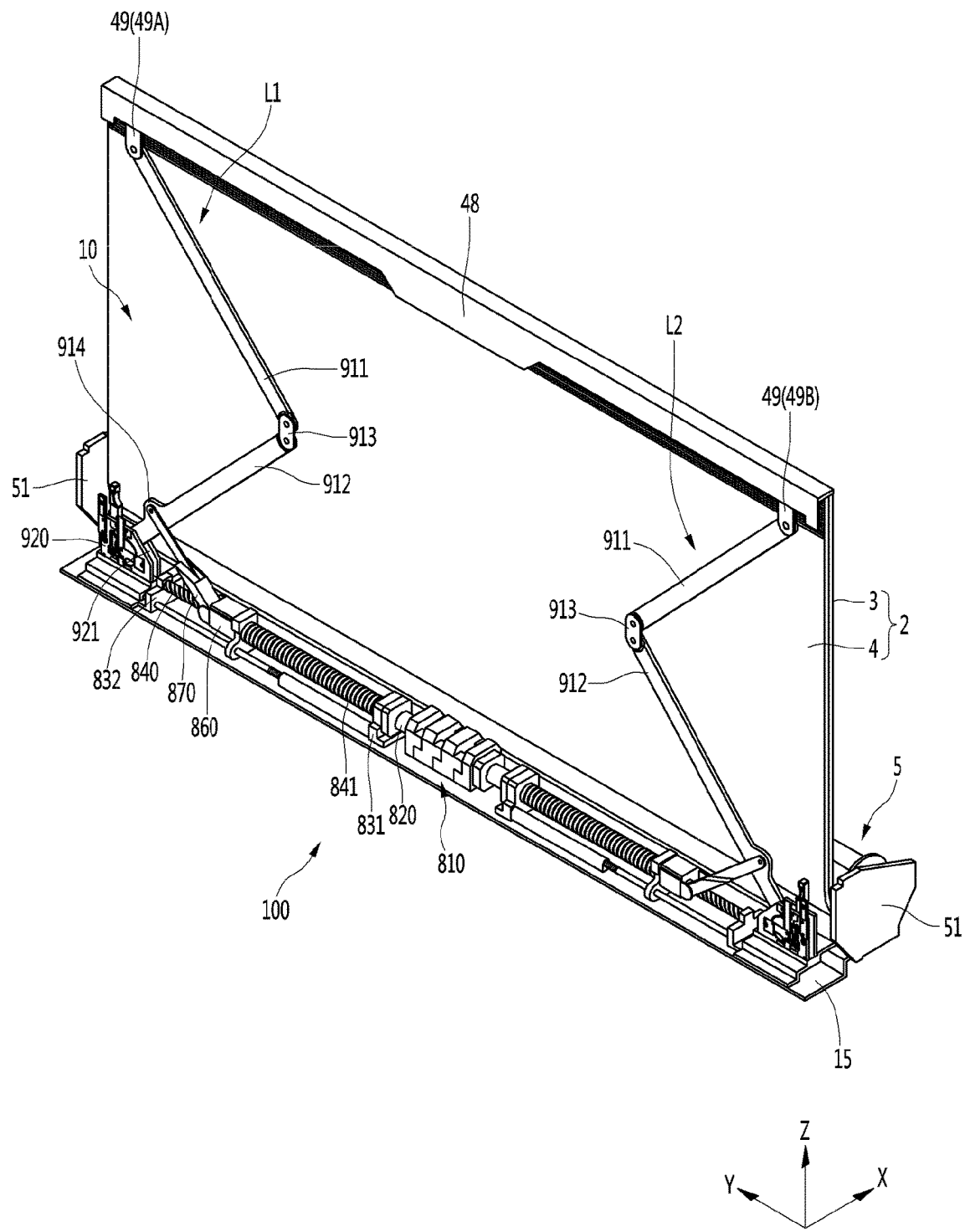
FIG. 10 is a perspective view illustrating a case where the lift module is lifting the display module, according to an embodiment of the present invention.
Figure 11:
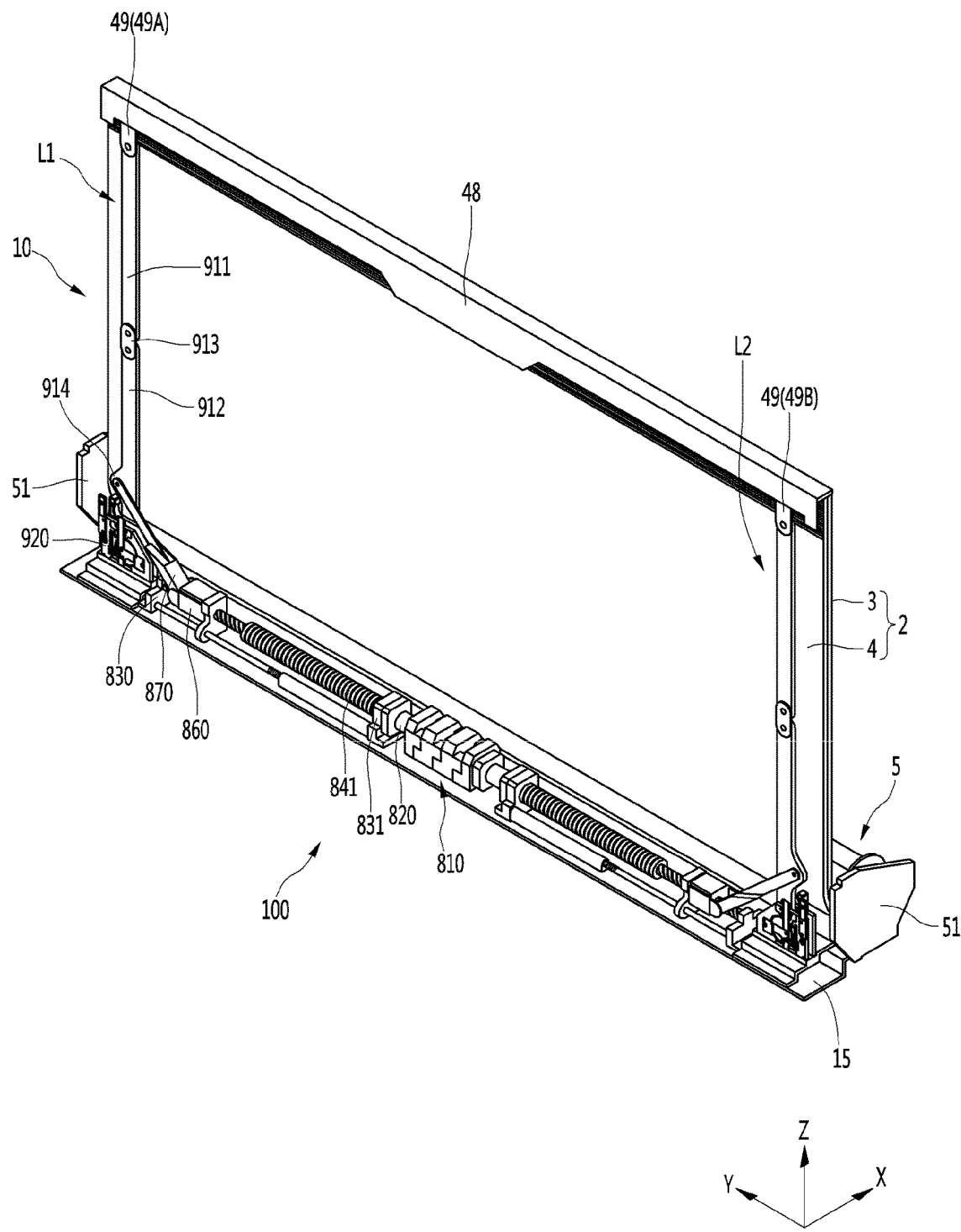
FIG. 11 is a perspective view illustrating a case where the lift module lifts the display module to a maximum height, according to an embodiment of the present invention.

FIG. 9 is a perspective view when the lift module lowers the display module, according to an embodiment of the present invention. FIG. 10 is a perspective view when the lift module lifts the display module, according to an embodiment of the present invention. FIG. 11 is a perspective view when the lift module lifts the display module to the highest height, according to an embodiment of the present invention.

The lift module 10 may further include the rotation mechanism 100 which rotates the second arm 912. The first arm 911, the second arm 912, the arm joint 913, and the rotation mechanism 100 may constitute the lift module 10 which lifts and lowering the upper portion of the display module 2.

The first arm 911, the second arm 912 and the arm joint 913 may constitute a link assembly. The link assembly may interlock with the rotation mechanism 100 to lift and lower the display module 2.

The display device may include a plurality of link assemblies which are assemblies of the first arm 911, the second arm 912, and the arm joint 913.

The plurality of link assemblies L1 and L2 are capable of vertically lifting and lowering the display module 2 together in a state of being horizontally spaced apart. The rotation mechanism 100 may be connected to each of the plurality of link assemblies L1 and L2 and may operate the plurality of link assemblies L1 and L2 together.

The plurality of link assemblies L1 and L2 may include a pair of link assemblies, and the pair of link assemblies may include a left link assembly L1 and a right link assembly L2. The left link assembly L1 and the right link assembly L2 may be spaced from each other in the horizontal direction and may be symmetrically arranged in the horizontal direction.

When the display device includes both the left link assembly L1 and the right link assembly L2, the first arm 911 of the left link assembly L1 may be connected to the left upper bracket 49A mounted on the left side of the connecting bar 48 by a hinge pin, and the first arm 911 of the right link assembly L2 may be connected to the right upper bracket 49B mounted on the right side of the connecting bar 48 by a hinge pin.

The rotation mechanism 100 may be connected to the second arm 912 to rotate the second arm 912 about the arm shaft P (see FIGS. 3 and 8). The second arm 912 may be formed in a connection part 914 to which the rotation mechanism 100 is connected. The connecting part 914 may be formed between the arm shaft P and the driving gear 918 of the second arm 912.

The rotation mechanism 100 may push or pull the second arm 912 in a state of being connected to the connecting part 914, and the second arm 912 may be rotated about the arm shaft P when pushed or pulled by the rotation mechanism 100. When the rotation mechanism 100 pushes the connecting part 914, the second arm 912 may be erected while rotating about the arm shaft P clockwise or counterclockwise (for example, clockwise). On the contrary, when the rotation mechanism 100 pulls the connecting part 914, the second arm 912 may be laid down while rotating about the arm shaft P clockwise or anticlockwise (for example, counterclockwise).

The rotation mechanism 100 may include at least one motor 810, a lead screw 840 rotated by the motor 810, a slider 860 slid along the lead screw 840 during rotation of the lead screw 840, and a connecting rod 870 connected to the slider 860 and the second arm 912 to push and pull the second arm 912 when the slider 860 slides.

When the rotation mechanism 100 rotates the pair of link assemblies L1 and L2 together, the rotation mechanism 100 may include at least one motor 810, a pair of lead screws 840, a pair of sliders 860, and a pair of connecting rods 870. When the display device includes the pair of link assemblies L1 and L2, the lead screw 840, the slider 860, and the connecting rod 870 may horizontally symmetrical with respect to the motor 180.

The motor 810 may be installed in the lift module supporter 15. The motor 810 may be a BLDC motor.

The driving shaft of the motor 810 may be disposed on both sides of the motor 810. The right driving shaft and the left driving shaft of the motor 810 may rotate in the same direction. Alternatively, the right driving shaft and the left driving shaft of the motor assembly 810 may rotate in opposite directions.

The lead screw 840 may be connected to the driving shaft of the motor 810 by a coupling 820.

The lead screw 840 may be disposed to penetrate the slider 860. A thread may be formed on the outer periphery of the lead screw 840.

The rotation mechanism 100 may further include at least one bearing 831 and 832 which supports the lead screw 840. The bearings 831 and 832 supporting the lead screw 840 may be mounted on the lift module supporter 15. The lead screw 840 may be rotatably supported by the pair of bearings 831 and 832. The pair of bearings 831 and 832 may be spaced from each other in the longitudinal direction of the lead screw 840.

The slider 860 may be formed with a hollow part through which the lead screw 840 passes. The hollow part of the slider 860 may be formed with a thread engaged with the thread of the lead screw, and may be linearly moved along the lead screw 840 in the longitudinal direction of the lead screw 840 during the rotation of the lead screw 840.

The rotation mechanism 100 may further include a spring 841 which elastically supports the slider 860. The length of the spring 841 may be shorter than the length of the lead screw 840. The spring 841 may be disposed between the bearing 831 and the slider 860. The spring 840 may be disposed between the slider 860 and the bearing 831 closer to the motor 810 among the pair of bearings 831 and 832. The spring 841 may be disposed so as to surround a part of the outer periphery of the lead screw 840. One end of the spring 841 may be connected to the bearing 831, and the other end may be separated from or in contact with the slider 860.

The spring 841 may be pushed and pressed by the slider 860 when the second arm 912 is laid horizontally. When the second arm 912 starts to be erected, the spring 841 may press the slider 860 in a direction opposite to the motor 810 while being restored to an original state.

When the restoring force of the spring 841 acts on the slider 860 as described above, the initial load of the motor 810 may be reduced at the time of initial startup of the motor 810 for erecting the second arm 912.

The connecting rod 870 may be formed with a slider connection part connected to the slider 860 by a hinge pin and a second arm connection part connected to the connection part 914 of the second arm 912 by a hinge pin.

The slider connection part may be formed on one side of the connecting rod 870 in the longitudinal direction, and the second arm connection part may be formed on the other side of the connecting rod 870 in the longitudinal direction.

When the slider 860 is brought close to the motor 810, the connecting rod 870 may be pulled by the slider 860 and pull the second arm 912 downward, and the second arm 912 may be laid while rotating in a direction approaching the motor 810 with respect to the arm supporters 920 and 921.

On the other hand, when the slider 860 moves away from the motor 810, the connecting rod 870 may be pushed by the slider 860 and lift the first arm 911, and the second arm 912 may be erected while rotating in a direction away from the motor 810 with respect to the arm supporters 920 and 921.

Figure 12:
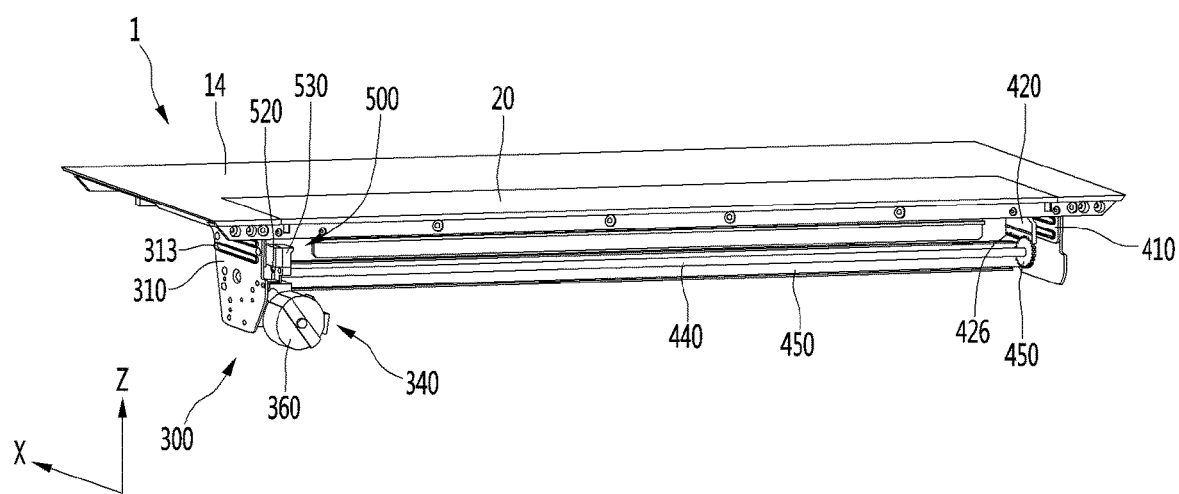
FIG. 12 is a view illustrating a door and a door driving module according to an embodiment of the present invention.
Figure 13:
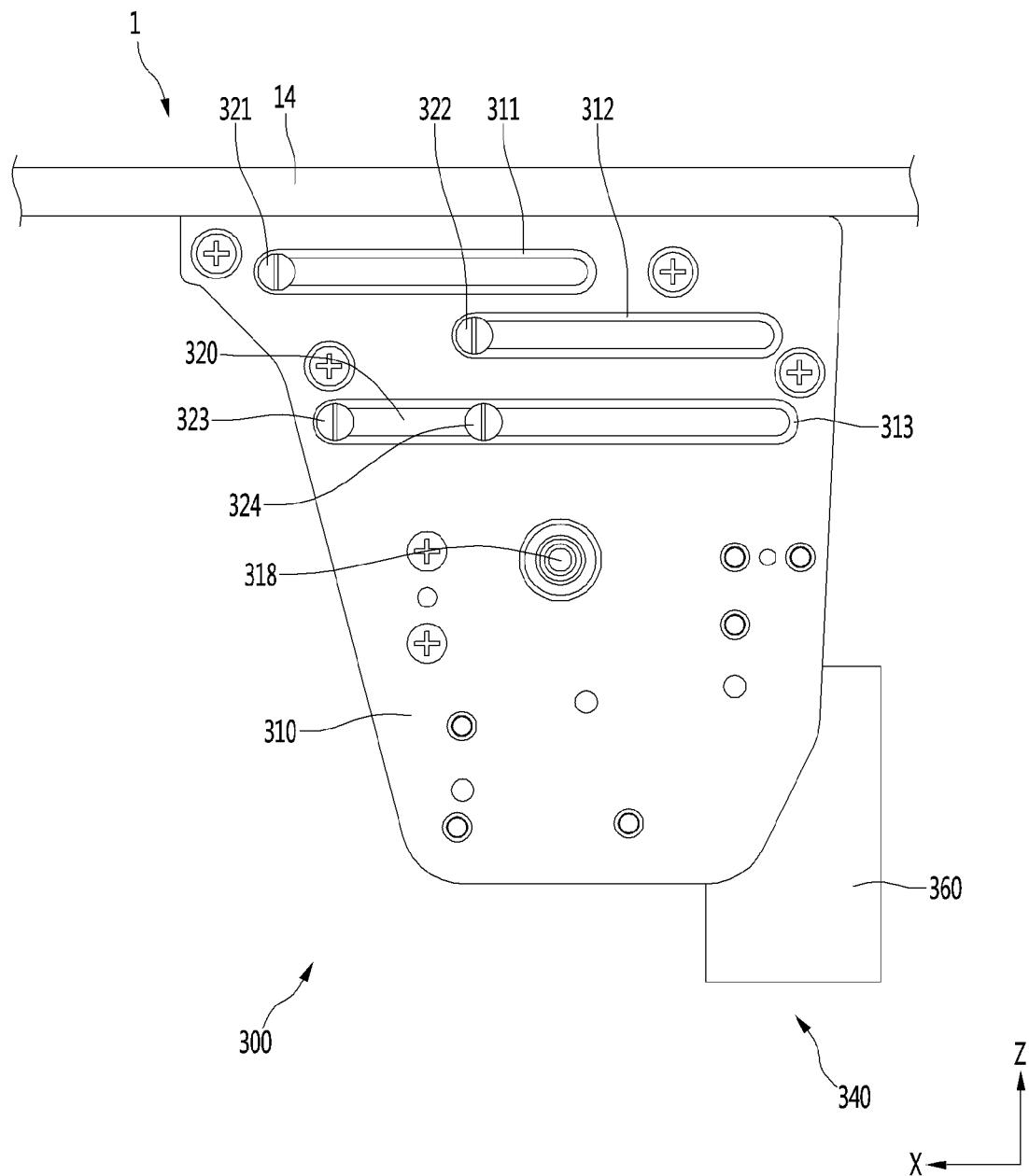
FIG. 13 is a side view of the door driving module according to an embodiment of the present invention.
Figure 14:
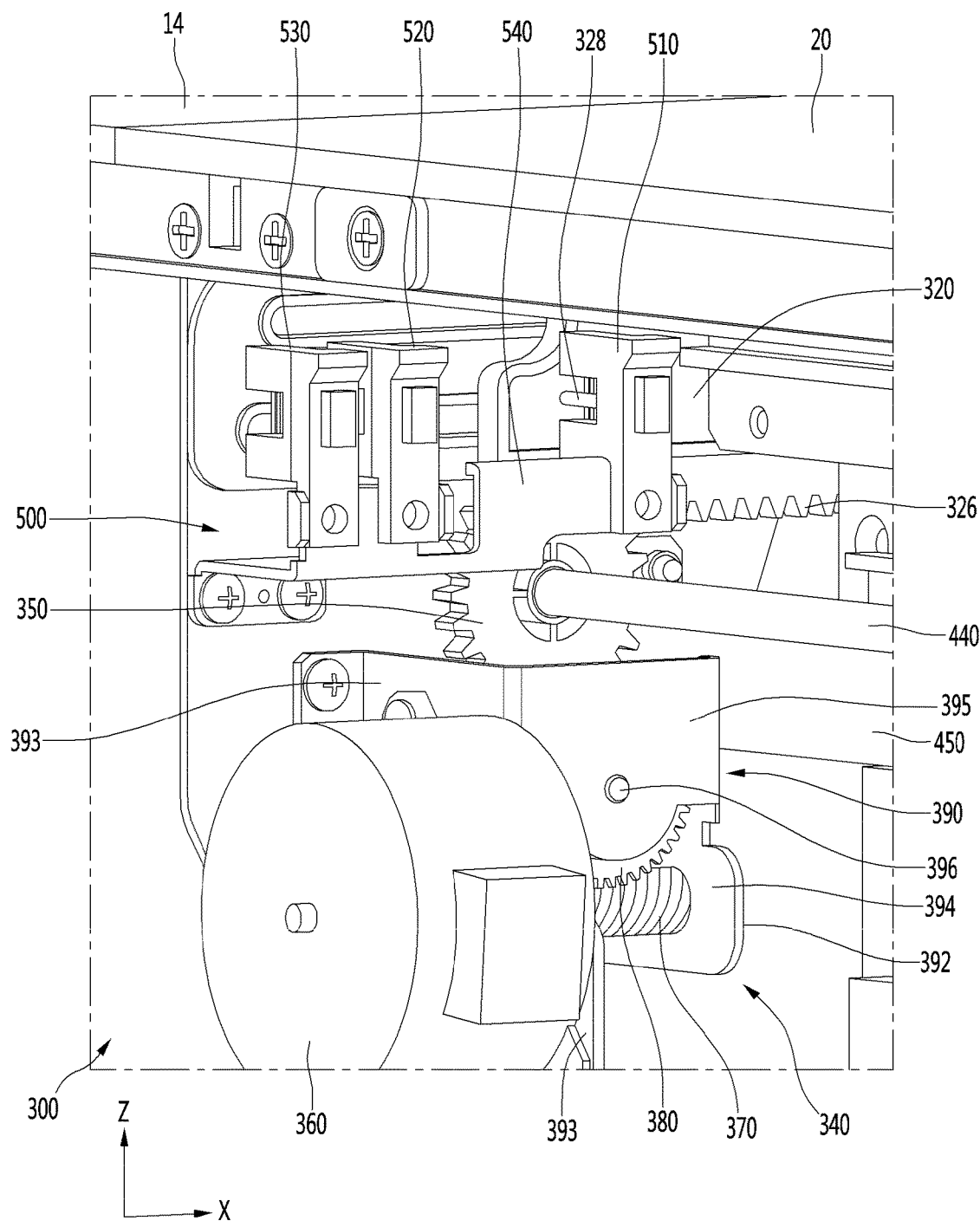
FIG. 14 is a partial enlarged perspective view of the door driving module according to an embodiment of the present invention.
Figure 15:
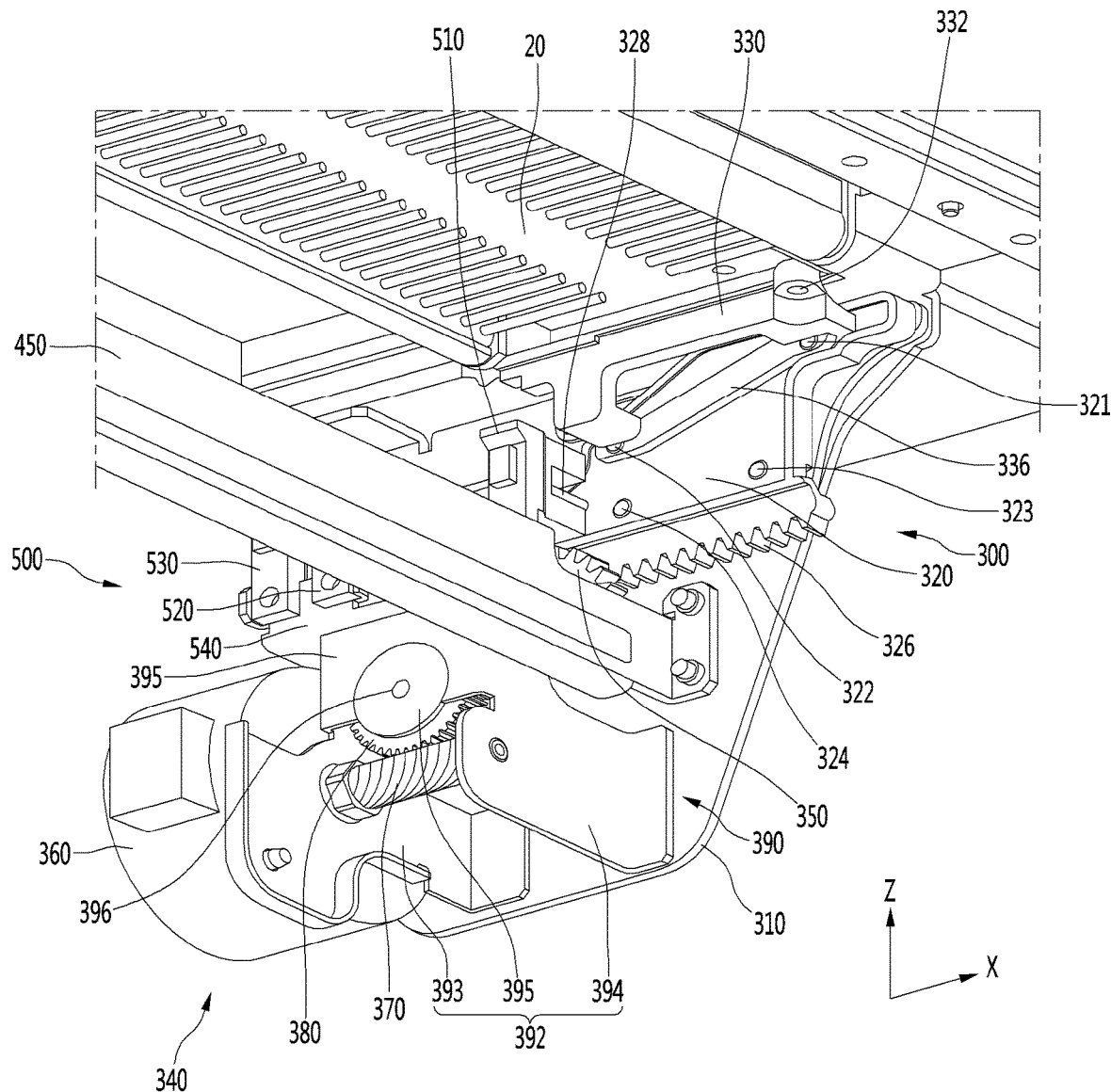
FIG. 15 is a perspective view of the door driving module according to an embodiment of the present invention, when viewed from a direction different from that of FIG. 13.

FIG. 12 is a view illustrating the door and the door driving module according to an embodiment of the present invention, and FIG. 13 is a side view of the door driving module according to an embodiment of the present invention. FIG. 14 is a partial enlarged perspective view of the door driving module according to an embodiment of the present invention, and FIG. 15 is a perspective view of the door driving module according to an embodiment of the present invention, when viewed from a direction different from that of FIG. 13.

The door driving module 300 may include a guide bracket 310 mounted in the housing 1, and carriers 320 and 330 connected to the door 20 and disposed to advance and retreat along the guide bracket 310.

The guide bracket 310 may be mounted on the upper plate 13 of the housing 1 with a fastening member such as a screw. The guide bracket 310 may be coupled to the upper plate 13 of the housing 1 and hung on the upper plate 13 of the housing 1. The guide bracket 310 may be vertically disposed in the space (S, see FIG. 5) of the housing 1. The lower end of the guide bracket 310 may be a free end.

The guide bracket 310 may be a carrier supporter for supporting the carriers 320 and 330, and may be a carrier guide for guiding the carriers 320 and 330 to advance and retreat in the front-rear direction (X).

The guide bracket 310 may be provided with at least one guide rail 311, 312, and 313 for guiding the carriers 320 and 330. The guide rails 311, 312, and 313 may be formed to be long in the front-rear direction (X) that is the advance and retreat direction of the carriers 320 and 330.

As illustrated in FIG. 13, the guide bracket 310 may be provided with a plurality of guide rails 311, 312, and 313. The plurality of guide rails 311, 312, and 313 may be formed with different heights. The plurality of guide rails 311, 312, and 313 may guide the straight-line movement of the carriers 320 and 330 at different heights in the front-rear direction. The plurality of guide rails 311, 312, and 313 may include a first guide rail 311 having the highest height, and a second guide rail 312 having a lower height than the first guide rail 311. The plurality of guide rails 311, 312, and 313 may further include a third guide rail 313 having a lower height than the second guide rail 312.

The guide bracket 310 may be a carrier guide for guiding the advance and retreat of the carriers 320 and 330.

The carriers 320 and 330 may be provided with a plurality of guide members 321, 322, 323, and 324. The plurality of guide members 321, 322, 323, and 324 may integrally protrude from the carriers 320 and 330, and may be coupled to the carriers 320 and 330. The plurality of guide members 321, 322, 323, and 324 may be configured by fastening members such as pins or screws passing through the guide rails 311, 312, and 313.

The carriers 320 and 330 may be provided with a plurality of guide members 321 and 322 having different heights.

The plurality of guide members 321 and 322 having different heights may include a first guide member 321 having a high height, and a second guide member 322 having a lower height than the first guide member 321.

One of the first guide member 321 and the second guide member 322 may be disposed to be closer to the front end of the carriers 320 and 330.

The first guide member 321 and the second guide member 322 may be different in the front-rear direction (X) position of the front ends thereof.

The carriers 320 and 330 may be supported and guided to the guide bracket 310 by the first guide member 321 and the second guide member 322 having different heights and positions.

When the first guide member 321 and the second guide member 322 are all provided in the carriers 320 and 330, the carriers 320 and 330 may be more stably supported than a case where the carriers 320 and 330 are supported by one of the first guide member 321 and the second guide member 322. When the carriers 320 and 330 advance or retreat, the carriers 320 and 330 may minimize shaking and may be stably advance and retreat.

The guide bracket 310 may be provided with a first guide rail 311 and a second guide rail 312.

The first guide rail 311 may guide the first guide member 321 having a high height among the plurality of guide members 321 and 322 and may be formed to be higher than the second guide rail 312.

The second guide rail 312 may guide the second guide member 322 having a lower height than the first guide member 321 among the plurality of guide members 321 and 322.

The first guide rail 311 and the second guide rail 312 may be formed in parallel to the guide bracket 310 and may be formed to have different heights. One of the front end of the first guide rail 311 and the front end of the second guide rail 312 may be disposed to be closer to the front end of the guide bracket 310 than the other thereof.

The carriers 320 and 330 may be provided with a plurality of third guide members 323 and 324 having different heights from the first guide member 321 and the second guide member 322. The plurality of third guide members 323 and 324 may have the same height.

The guide bracket 310 may be provided with a third guide rail 313 for guiding the plurality of third guide members 323 and 324 having the same height.

The third guide rail 313 may be formed in parallel to the first guide rail 311 and the second guide rail 312. The third guide rail 313 may be formed at a different height from the first guide rail 311 and the second guide rail 312. The third guide rail 313 may be formed to be longer than the first guide rail 311 and the second guide rail 312.

As such, when the plurality of third guide members 323 and 324 having the same height are provided at different heights from the first guide member 321 and the second guide member 322, the horizontal states of the carriers 320 and 330 may are maintained by the plurality of third guide members 323 and 324 having the same height, and the carriers 320 and 330 may not rotate around the first guide member 321 or the second guide member 322.

The carriers 320 and 330 can stably advance and retreat in the front-back direction (X) in a state of being maintained in the horizontal state by the plurality of third guide members 323 and 324 having the same height.

A pair of third guide members 323 and 324 may be provided in the carriers 320 and 330, and the pair of third guide members 323 and 324 may be spaced apart in the longitudinal direction of the third guide rail 313. The spacing distance of the pair of third guide members 323 and 324 may be shorter than the length of the third guide rail 313.

When one third guide member 323 among the pair of third guide member 323 and 324 is in the door closed position, the third guide member 323 may come into contact with the front end of the third guide rail 313 and stop. When the other third guide member 324 among the pair of third guide member 323 and 324 is in the door maximum open position, the third guide member 324 may come into contact with the rear end of the third guide rail 313 and stop.

In this case, the third guide rail 313 may determine the door closed position and the door maximum open position of the carriers 320 and 330.

Meanwhile, referring to FIG. 13, the guide bracket 310 may be provided with a pinion support part 318 to which a pinion 350 to be described below is rotatably supported. The pinion support part 318 may be formed at a lower height than each of the plurality of guide rails 311, 312, and 313 to be formed in the guide bracket 310.

The carriers 320 and 330 move the door 20 while performing straight-line motion along the guide bracket 310. The carriers 320 and 330 may be connected to the door 20 such that the moving direction of the carriers 320 and 330 is the same as the moving direction of the door 20. The carriers 320 and 330 may be connected to the door 20 so as to be positioned below the door 20.

The carriers 320 and 330 may advance and retreat by an advance and retreat mechanism 340 to be described below. In the carriers 320 and 330, a rack 326 which advance and retreat by the advance and retreat mechanism 340 may be formed to be elongated in the advance and retreat direction of the carriers 320 and 330.

The carriers 320 and 330 may include a moving body 320 connected to the advance and retreat mechanism 340. The carriers 320 and 330 may further include a door connector 330 connected to the door 20.

The moving body 320 may be provided with the rack engaged with the pinion 350 of the advance and retreat mechanism 340 to be described below. The rack 326 may be formed to be elongated at the lower end of the moving body in the front-rear direction (X).

The moving body 320 may be provided with a sensing target 328 selectively sensed by a plurality of sensors 510, 520, and 530 to be described below. The sensing target 328 may protrude from one of both surfaces of the moving body 320 which faces the plurality of sensors 510, 520, and 530. The sensing target 328 may be a protrusion formed in the moving body 320.

The door connector 330 may be connected to each of the door 20 and the moving body 320. A door fastening part 332 in which the door connector 330 is fastened to the door 20 with a fastening member such as a screw may be formed at the upper portion of the door connector 330. The door connector 330 may be fastened to the moving body 320 with a fastening member such as a screw, and may be fastened with the first guide member 321, and the second guide member 322 illustrated in FIG. 13. The first guide member 321, and the second guide member 322 may pass through the guide member through-hole formed in the moving body 320 and may be fastened to the door connector 330.

Meanwhile, the moving body 320 and the door connector 330 may be integrally formed.

The door driving module 300 may include the advance and retreat mechanism 340 for advancing and retreating the carriers 320 and 330. The advance and retreat mechanism 340 may be mounted on the guide bracket 310 and may be connected to the carriers 320 and 330, particularly the moving body 320, and cause the moving body 320 to perform straight-line motion.

The advance and retreat mechanism 340 may include a pinion 350, a motor 360, and at least one power transmission member 370, 380, and 390.

The pinion 350 may be engaged with the rack 326. The pinion 350 may be rotatably supported to the guide bracket 310. The central shaft of the pinion 430 may be rotatably supported to the pinion support part (318, see FIG. 13) formed in the guide bracket 310.

The motor 360 is a driving source for generating a driving force for causing the door 20 to perform straight-line motion. The motor 360 may be connected to the power transmission members 370, 380, and 390 to rotate the pinion 350 through the power transmission members 370, 380, and 390.

The at least one power transmission member 370, 380, and 390 may transmit the driving force of the motor 360 to the pinion 350.

The advance and retreat mechanism 340 may include the plurality of power transmission members 370, 380, and 390, and the plurality of power transmission members 370, 380, and 390 may include a worm gear 370 and a worm wheel 380.

The worm gear 370 may be connected to the rotational shaft of the motor 360. The worm gear 370 may be disposed to be elongated in the advance and retreat direction of the door 20.

The worm wheel 380 may be engaged with the worm gear 370.

The plurality of power transmission members 370, 380, and 390 may further include a torque limiter (or a torque releasor) 390.

The torque limiter 390 may be connected to the worm wheel 380. The torque limiter 390 may include a gear engaged with the pinion 350. The torque limiter 390 is a torque electric limiter designed such that a joint part transmitting a rotational force slips or falls off when a load is applied to a specified value or more, and is a safety device which interrupts power during overloading between the worm wheel 380 and the pinion 350. The torque limiter 390 may be a combination of a plurality of members and may include a spring.

The torque limiter 390 may include a mounter 392 fastened to the guide bracket 310 with a fastening member such as a screw. The mounter 392 may form the outer appearance of the torque limiter 390 and may be an object on which the motor 360 or the like is mounted.

The mounter 392 may include a motor mounter 393 to which the motor 360 can be fastened, a worm gear supporter 394 spaced apart from the motor mounter 393 and rotatably supporting the worm gear 370, and a worm wheel supporter 395 rotatably supporting the worm wheel 380.

The motor mounter 393 may be positioned in front of the motor 360, and the motor 360 may be protected by the motor mounter 393.

The worm gear supporter 394 may be spaced apart in front of the motor mounter 393 in the front-rear direction. The worm gear 370 may be positioned between the motor mounter 393 and the worm gear supporter 394, and may be protected by the motor mounter 393 and the worm gear supporter 394.

The worm wheel supporter 395 may be formed to connect the motor mounter 393 and the worm gear supporter 394. The worm wheel supporter 395 may be located beside the worm wheel 380 and may cover a part of the worm wheel 380.

The worm wheel supporter 395 may be provided with a shaft supporter 396 which rotatably supports the central shaft of the worm wheel 380.

Meanwhile, the display device may further include a sub-assembly connected with the pinion 350 and advancing and retreating the door 20.

As illustrated in FIG. 12, the display device may further include: a sub-guide bracket 410; a sub-carrier 420 connected to the door 20, provided with a sub-rack 426, and advancing and retreating along the sub-guide bracket 410; a sub-pinion 450 engaged with the sub-rack 426; and an connecting shaft 440 connecting the pinion 350 and the sub-pinion 450.

The sub-carrier 420 and the sub-pinion 450 may constitute the sub-assembly, and may be positioned on the side opposite to the carrier 320 and the pinion 350.

The sub-guide bracket 410 may be mounted on the housing 1 and spaced apart from the guide bracket 310. The sub-guide bracket 410 may be mounted on the housing 1 so as to be symmetrical to the guide bracket 310. The sub-guide bracket 410 may be spaced apart from the guide bracket 310 in the horizontal direction (Y).

The sub-guide bracket 410 may be provided with a sub-pinion support part (not illustrated) rotatably supporting the central shaft of the sub-pinion 450.

The sub-carrier 420 may be directly connected to the door 20. The sub-carrier 420 may be disposed in the sub-guide bracket 310 so as to be symmetrical to the carriers 320 and 330. The sub-carrier 420 may be spaced apart from the carriers 320 and 330 in the horizontal direction, particularly, the left-right direction (Y). The sub-carrier 420 may have a structure symmetrical to the carriers 320 and 330, and may be a combination of a plurality of members like the carriers 320 and 330.

The sub-pinion 450 may be rotatably disposed in the sub-guide bracket 410. The central shaft of the sub-pinion 450 may be rotatably supported to the sub-pinion support part formed in the sub-guide bracket 410.

The connecting shaft 440 may be disposed across a gap between the guide bracket 310 and the sub-guide bracket 410, and may rotate the sub-pinion 450 during the rotation of the pinion 350. The connecting shaft 440 may be positioned in front of or behind the guide plate 450 and may be protected by the guide plate 450.

The display device may further include a guide plate 450 for connecting the guide bracket 310 and the sub-guide bracket 410.

The guide plate 450 may be disposed between the guide bracket 310 and the sub-guide bracket 410. The guide plate 450 may connect the guide bracket 310 and the sub-guide bracket 410, may reinforce the strength of the guide bracket 310 and the sub-guide bracket 410, and may minimize the deformation of the guide bracket 310 and the sub-guide bracket 410.

The display device may further include a sensor module 500 for sensing the position of the door 20. The sensor module 500 may be mounted on the guide bracket 310. The sensor module 500 may sense the position of the door 20 or sense the positions of the carriers 320 and 330. The sensor module 500 preferably includes a non-contact-type sensor, and particularly, preferably includes an optical sensor.

The display device may include a plurality of sensors 510, 520, and 530 disposed in a row in the advance and retreat direction of the carriers 320 and 330. The display device may further include a sensor mounter 540 installed in the guide bracket 310. The plurality of sensors 510, 520, and 530 may be disposed in the sensor mounter 540 in a row in the advance and retreat direction of the carriers 320 and 330.

The plurality of sensors 510, 520, and 530 may include a first sensor 510 for sensing the closed position P1 of the door 20, a second sensor 520 for sensing the partially open position P2 of the door 20, and a third sensor 530 for sensing the maximum open position P3 of the door 20.

The first sensor 510 may be a sensor disposed at the most front among the first sensor 510, the second sensor 520, and the third sensor 530.

The second sensor 520 may be disposed between the first sensor 510 and the third sensor 530. The second sensor 520 may be closer to the third sensor 530 rather than the first sensor 510.

The third sensor 530 may be a sensor disposed at the most rear among the first sensor 510, the second sensor 520, and the third sensor 530.

Each of the first sensor 510, the second sensor 520, and the third sensor 530 may include an optical sensor having a light emitting element and a light receiving element, and for example, may include a photo sensor in which a light emitting element and a light receiving element are disposed to face each other.

The sensing target 328 may pass between the light emitting element and the light receiving element during the movement of the carriers 320 and 330, and the photo sensor may sense the position of the sensing target 328 when the sensing target 328 is positioned between the light emitting element and the light receiving element.

The first sensor 510, the second sensor 520, and the third sensor 530 may be disposed in this order in the retreat direction of the carriers 320 and 330.

The first sensor 510, the second sensor 520, and the third sensor 530 may be mounted on the sensor mounter 540 together, and the first sensor 510, the second sensor 520, the third sensor 530, and the sensor mounter 540 may constitute the sensor module 500.

The carriers 320 and 330 may be provided with the sensing target 328 selectively sensed by the plurality of sensors 510, 520, and 530. The sensor target 328 may protrude from the carriers 320 and 330. The sensor target 328 may be provided on the face of the carriers 320 and 330 facing the plurality of sensors 510, 520, and 530. The sensor target 328 may be formed at a height passing between the light emitting element and the light receiving element of the optical sensor. When the sensor target 328 is positioned between the light emitting element and the light receiving element, the light of the light emitting element may not be incident on the light receiving element and the optical sensor may sense this.

According to the embodiments, since the display device can be lifted in a state in which the door moves to the maximum open position, the display module can be stably lifted without interfering with the door.

When the display module is lifted and then the height is not changed, the door moves to the partially open position such that the gap between the display module and the door can be reduced, the penetration of foreign substances through the opening can be minimized, and the safety accident can be prevented.

The above description is merely illustrative of the technical idea of the present invention, and various modifications and changes may be made by those skilled in the art without departing from the essential characteristics of the present invention.

Therefore, the embodiments disclosed in the present invention are not intended to limit the scope of the present invention, and the scope of the present invention is not limited by these embodiments.

The scope of protection of the present invention should be construed according to the following claims, and all technical ideas within the scope of equivalents thereof should be construed as falling within the scope of the present invention.

What is claimed is:

1. A display device comprising:
   a housing comprising an opening;
   a roller disposed in the housing;
   a display module configured to be rolled around the roller;
   a control unit;
   a lift module configured to raise the display module through the opening to a raised position;
   a door configured to cover the opening; and
   a door driving module disposed in the housing and configured to selectively move the door to a closed position, a partially open position, and a maximum open position,
   wherein the control unit is configured to:
   control the door driving module to move the door to the maximum open position;
   control the lift module to raise the display module through the opening to the raised position while the door is in the maximum open position; and
   control the door driving module to move the door to the partially open position when the display module is in the raised position.

2. The display device according to claim 1, wherein the raised position corresponds to a partially raised height or a maximum raised height.

3. The display device according to claim 1, wherein when power to the display device is turned off, the control unit is further configured to control the door driving module to move the door to the maximum open position, control the lift module to lower the display module through the opening while the door is in the maximum open position, and control the door driving module to move the door to the closed position.

4. The display device according to claim 3, wherein the door is moved to the closed position after the display module is lowered to a maximum lowered height.

5. The display device according to claim 1, wherein the door driving module comprises:
   a guide bracket disposed in the housing; and a carrier coupled to the door and disposed to advance and retreat along the guide bracket, wherein the guide bracket is provided with a sensor module configured to sense a position of the carrier.

6. The display device according to claim 5, wherein:

the sensor module comprises a plurality of sensors disposed along an advance and retreat direction of the carrier; and the plurality of sensors are configured to detect a sensing target disposed on the carrier.

7. The display device according to claim 6, wherein:

the plurality of sensors comprise a photo sensor comprising a light emitting element and a light receiving element facing each other, and the sensing target passes between the light emitting element and the light receiving element.

8. The display device according to claim 6, wherein the plurality of sensors comprise:

a first sensor configured to sense the closed position of the door;

a second sensor configured to sense the partially open position of the door; and a third sensor configured to sense the maximum open position of the door.

9. The display device according to claim 8, wherein:

the second sensor is disposed between the first sensor and the third sensor; and the second sensor is disposed to be closer to the third sensor than the first sensor.

10. The display device according to claim 8, wherein:

the sensor module further comprises a sensor mounter disposed at the guide bracket, and the plurality of sensors are mounted on the sensor mounter.

11. The display device according to claim 1, wherein the door driving module comprises:

a guide bracket disposed in the housing;

a carrier coupled to the door and disposed to advance and retreat along the guide bracket; and a plurality of guide members disposed at different heights on the carrier, wherein the guide bracket comprises:

a first guide rail engaged with a first guide member disposed at a highest height on the carrier among the plurality of guide members; and a second guide rail engaged with second guide member disposed at a lower height on the carrier than the first guide member.

12. The display device according to claim 11, wherein the guide bracket further comprises a third guide rail engaged with a plurality of third guide members having a different height than the first guide member and the second guide member.

13. The display device according to claim 12, wherein the third guide rail is disposed at a lower height on the carrier than the first guide rail and the second guide rail.

14. The display device according to claim 1, wherein the door driving module comprises:

a guide bracket disposed in the housing;

a carrier coupled to the door and disposed to advance and retreat along the guide bracket; and an advance and retreat mechanism mounted on the guide bracket and configured to cause the carrier to advance and retreat.

15. The display device according to claim 14, wherein the carrier comprises a rack which is elongated in an advance and retreat direction of the carrier, and the advance and retreat mechanism comprises:

a pinion engaged with the rack;

a motor; and at least one power transmission member configured to transmit a driving force of the motor to the pinion.

16. The display device according to claim 15, wherein the at least one power transmission member comprises:

a worm gear connected to a rotational shaft of the motor;

a worm wheel engaged with the worm gear; and a torque limiter coupled to the worm wheel and comprising a gear engaged with the pinion.

17. The display device according to claim 15, further comprising:

a sub-guide bracket disposed in the housing and spaced apart from the guide bracket;

a sub-carrier coupled to the door and comprising a sub-rack and configured to advance and retreat along the sub-guide bracket;

a sub-pinion engaged with the sub-rack; and an connecting shaft coupling the pinion and the sub-pinion.

18. The display device according to claim 17, further comprising a guide plate coupling the guide bracket and the sub-guide bracket.

* * * * *